United States Patent [19]

Werner

[11] Patent Number: 4,604,021

[45] Date of Patent: Aug. 5, 1986

[54] LIFTING BEAM MANIPULATOR ASSEMBLY FOR FORGING PRESSES

[75] Inventor: Eberhard Werner, Leverkusen, Fed. Rep. of Germany

[73] Assignee: Eumuco Aktiengesellschaft für Maschinenbau, Leverkusen, Fed. Rep. of Germany

[21] Appl. No.: 558,733

[22] Filed: Dec. 6, 1983

[30] Foreign Application Priority Data

Dec. 8, 1982 [DE] Fed. Rep. of Germany ....... 3245317

[51] Int. Cl.$^4$ .................. B65H 1/00; B21D 43/10
[52] U.S. Cl. ................................ 414/226; 72/422; 414/751; 901/22
[58] Field of Search .................. 901/16, 22; 414/751, 414/226, 225; 72/361, 405, 422

[56] References Cited

U.S. PATENT DOCUMENTS

| | | | |
|---|---|---|---|
| 2,807,373 | 9/1957 | Couser | 901/22 X |
| 3,010,587 | 11/1961 | Hollinger | 901/22 X |
| 3,546,956 | 12/1970 | Blatt | 901/22 X |
| 3,834,213 | 9/1974 | Henzler et al. | 72/405 |
| 4,229,130 | 10/1980 | Painssidi | 901/16 X |

FOREIGN PATENT DOCUMENTS 2098577 11/1982 United Kingdom ................ 901/16

*Primary Examiner*—William E. Wayner
*Attorney, Agent, or Firm*—Neil F. Markva

[57] ABSTRACT

The lifting beam manipulator assembly is used for transporting workpieces in a forging press having machine tools. The assembly comprises a lifting beam including a carrier that is movable forwards and backwards and has workpiece grasping means. The grasping means includes a pair of grab arms located at each of the machining positions. A control mechanism is provided for the lifting beam for controlling the movement of the carrier along a workpiece transporting path which includes movement in three axes which are perpendicular with respect to each other. The movement control mechanism includes a linear transport means for movement along each of the axes and individual drive assemblies for each linear transport mechanism for effecting each movement of the carrier in the three axes. A limit switch gear mechanism activates each of the individual drive mechanisms for the linear transport means. A blowing and spraying apparatus is provided for cleaning, lubricating and cooling the machine tools between each of the forge pressing operations.

16 Claims, 4 Drawing Figures

LIFTING BEAM MANIPULATOR ASSEMBLY FOR FORGING PRESSES

FIELD OF THE INVENTION

The invention relates to a lifting beam manipulator assembly used with drop-forging presses and the like for transporting workpieces from machining position to machining position by being lifted, passed on and lowered. More particularly, the lifting beam assembly includes a lifting beam having a plurality of carriers which are movable backwards and forwards and carries actuable grab arms. The number of carriers correspond to the number of machining positions. A blowing and spraying mechanism is also provided for the machine tools.

BACKGROUND OF THE INVENTION

When forging with burr, only each second machining position is occupied in a forging press. To have sufficient time for cleaning and cooling the forging dies, the lifting beam, with which the grap arms of the carrier carry out a forwards movement from the machining positions (referred to herein as grab withdrawal) when the transporting step is carried out from one machining position to the next. With this method of transport, the workpieces leave the center of the press in a forward direction with respect to the press structure after they have been lifted out of the tools of the foregoing machine and are taken out of the tool area from one machining position to the next.

When the tools are freed of workpieces and this way, sufficient space and time is created for cleaning, lubricating and cooling the tools. Thus, the workpieces may be machined with each machining position occupied, and all the tools being occupied with a forging part during the pressing stroke. The grab withdrawal during the transport of the workpieces from position to position enables a spraying beam to be introduced into the pressing space and the tools such as dies may be blown out and sprayed accurately and reliably. If each machining position is occupied the output of the forging machine can be increased by a considerable amount.

In order for each machining position to be occupied with workpieces, at the same time permitting adequate cleaning and lubricating of the workpieces, a control housing having a driven shaft fitted with pairs of cams has been used to actuate the transport processing such as lifting, lowering and carrying out the movement step and withdrawing the grab arms with the associated operational linkage. The linkage of the pair of cams for the withdrawal here acts on a hydraulic cylinder which is hydraulically coupled to a hydraulic cylinder for the forwards and backwards movement of the carrier used to carry the grab arms. This produces control for the movement of the lifting beam in the three axes. With the cam-controlled design of the lifting beam manipulator assembly, changes may be made in the transport path simply by inserting different cam plates on the driven camshaft.

PURPOSE OF THE INVENTION

The primary object of the invention is to provide a lifting beam manipulator assembly wherein each machining position of the forging machine may be occupied with workpieces while at the same time permitting adequate cleaning, lubricating and cooling of the tools and wherein the control movements for the carrier holding the grab arms are quick and easy to change.

Another purpose of this invention is to provide a lifting beam manipulator assembly which enables the control movements to be changed easily and the machine to be better suited for adapting to changing requirements.

A still further object of the invention is to provide a lifting beam manipulator assembly wherein there is a possibility for enabling the shape of the transport path for the carrier to be changed without great expenditure and thereby providing considerable freedom for forming the movements of the lifting beam manipulator assembly so that the assembly can be used flexibly.

SUMMARY OF THE INVENTION

As described and disclosed herein, the lifting beam manipulator assembly includes a transport slide mechanism having an individual drive arrangement for each movement of the carrier in three axes which are perpendicular with respect to each other. The assembly includes a limit switch gearing mechanism used as a central control device.

This type of design for the lifting beam manipulator enables the control movements to be changed easily and the machine is better suited to adapting to changing requirements. The possibility is created for enabling the shape of the transport path to be changed without any great expenditure. This means that considerable freedom is created for forming the movements of the lifting beam manipulator so that the lifting beam manipulator can be used flexibly.

Another feature of the invention is directed to the configuration of the individual drive mechanism formed by a hydraulic rotary piston motor having a crank with a connecting rod carrying out an angle of pivot of 180°. The crank and/or the connecting rod are each designed to be adjustable with respect to its overall length. Thus, the lifting position of the respective transport slide mechanism can be changed as required. For example, the change of the connecting rod between the transport slide and the crank of the rotary piston motor will directly effect the amount of movement that is effected by that transport slide. The transporting step can be also changed in the respective axis by changing the radius of the crank with relatively low expenditure. Moreover, the trigger point for the start of the movement in the respective axes of the transport path can be changed as necessary by suitable selection. Any possibilities are thus created for changing the transport movement of the grab arms and there carrier in a relatively simple manner.

A further feature of the invention is directed to the combination of the camshaft gear connected to a variable-speed motor which combination is used as a limit switch gear. The cycle time of the lifting beam manipulator assembly corresponds to the cycle time of the limit switch gearing. On the one hand, the course of the transport path is determined in principle by a continually operating limit switch gearing mechanism as disclosed. On the other hand, the number of manipulator cycles per time unit is determined according in each case to the predetermined speed of the limit switch gearing. By changing the cycle time of the limit switch gearing, the cycle time of the lifting beam manipulator assembly can be changed. The camshaft gear advantageously comprises control drums with signal members linked via an electronic switching device and control lines to the control valves of the rotary piston motors.

The respective transport mechanisms are advantageously mounted in a double column design having guide means for these transport members which operate in a simple and reliable manner.

BRIEF DESCRIPTION OF DRAWINGS

Other objects of this invention will appear in the following description and appended claims, reference being made to the accompanying drawings forming a part of the specification wherein like reference characters designate corresponding parts in the several view.

DETAILED DESCRIPTION

Figure 1:
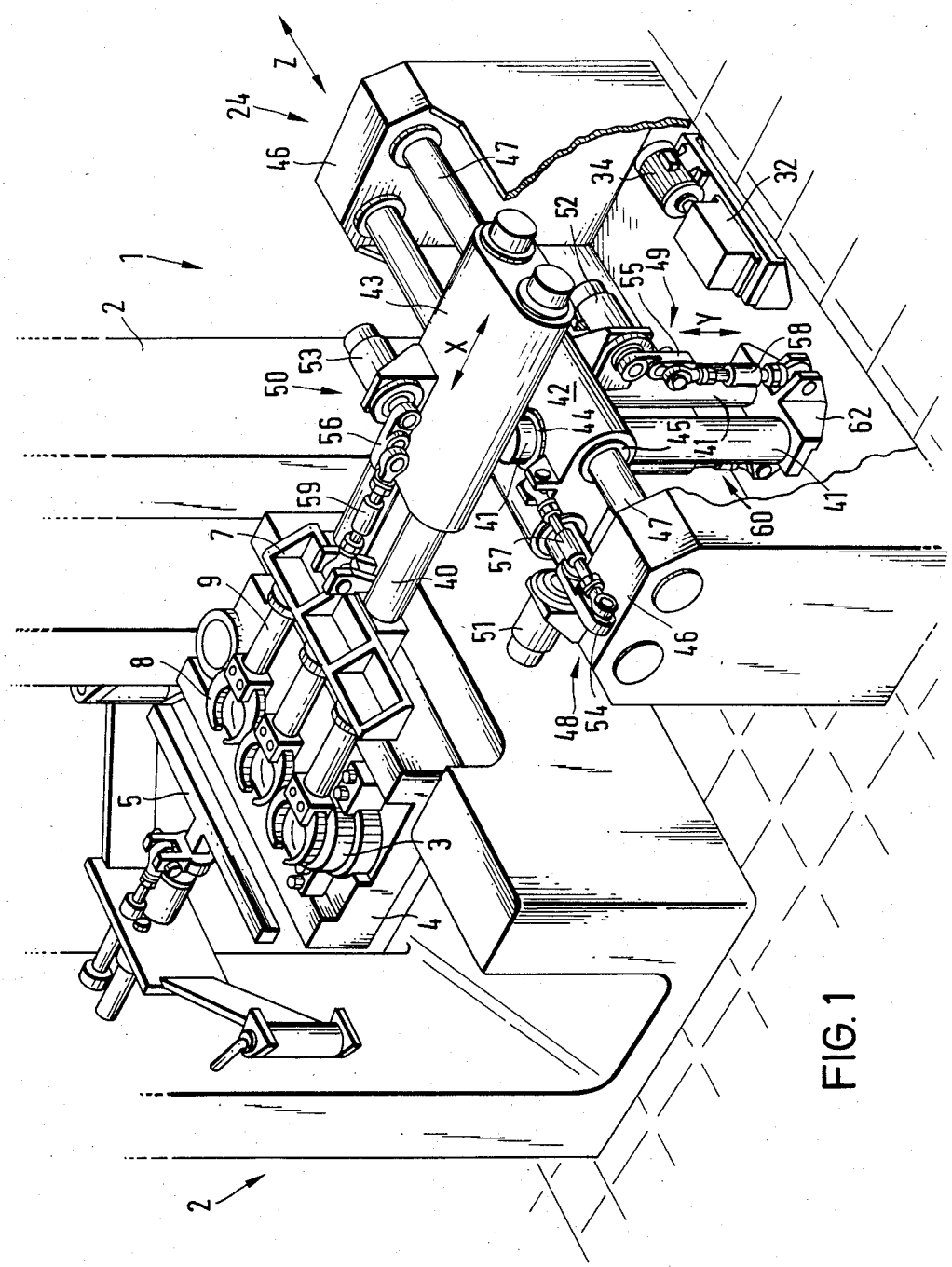
FIG. 1 is a perspective view showing a lifting beam manipulator assembly according to the invention.
Figure 2:
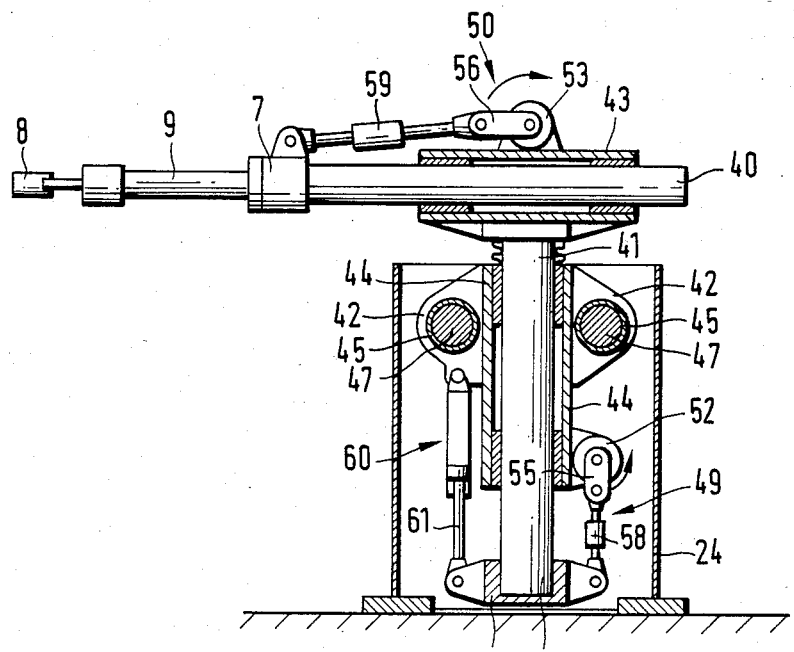
FIG. 2 is a side elevational view, partially in section, of the lifting beam manipulator apparatus shown in FIG. 1.

The lifting beam manipulator assembly, generally designated 1, is installed in front of or behind a drop-forging press 2 or other forging machine and is connected to the floor so that it can be moved away such as for changing dies and the like. It has no mechanical connections with the forging press. Press 2, shown schematically, has a row of dies 3 arranged next to each other and secured to a base plate 4. The raw material heated for automatic forging is placed into the first die 3 of the roll of tools by a known inserting device (not shown). The lifting beam manipulator assembly 1 effects the rest of the transportation automatically. The finished forged parts are de-burred in the final operation which is in a downward direction. The burr is removed from a de-burring tool with a separate device. In the embodiment as shown, a blowing and spraying device 5 is displaceably disposed on the rear of press 2 for cleaning and cooling dies 3.

A plurality of grab arms 8 mounted on carrier 7 via holders 9 grasp the workpieces for transporting same to the next work station. Each holder 9 includes a mechanism for moving the grab arms 8 and also for rotating each of the grab arms 8 about their longitudinal axis. Such a holding mechanism is well known.

Figure 3:
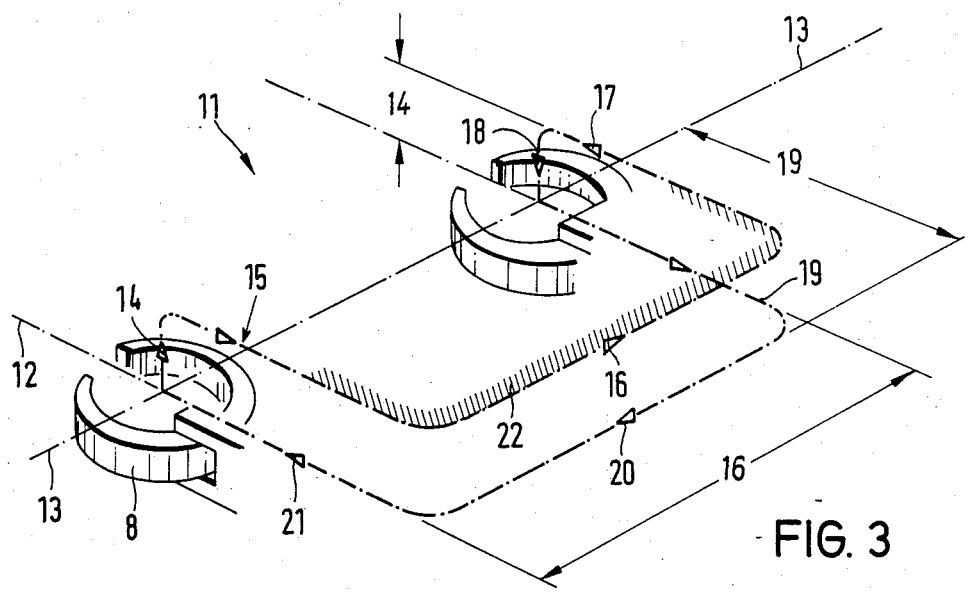
FIG. 3 is a perspective schematic representation showing the transport movement of the grab arms operatively mounted on the carrier member.

Each pair of grab arms 8 with the grab carrier 7, follows the path 11 shown in FIG. 3. The starting position of the grab arms 8 is at the center of the dies 3 and center of the press 2 according to lines 12 and 13. Grab arms 8 are first closed, carry out the vertical lift along line 14 and then pass to the grab withdrawal position 15, in order then to carry out step 16 to the center of the next tool. Then follows the return movement along line 17 and lowering along line 18 which is equivalent to the vertical lift along line and height 14 with movement over the center of the next die 3 and into the center of the press 2. Once grab arms 8 have opened and deposited the workpieces, they commence the return path 19 and carry out the reverse 20 of step 16 along line 21.

The pressing stroke is carried out in the area of the path section 20 during withdrawal of grab arms 8 which move along path 21 to the center of the first die 3 and center of the press 2. In the course of the complete cycle of movement, the grab arms 8 and grab carrier 7 have moved out of the tool space according to the workpiece path 11. On the one hand, a workpiece is carried along the path 15, 16, 17 and on the other hand, grab arms 8 move without a workpiece along the path 19, 20, 21 thereby returning to the center of press 2.

The forwardly displaced stepping movement of the grab withdrawal is located in the shaded portion 22 of path sections 15, 16, 17 where the grab arms 8 hold a workpiece outside the pressing area. During the grab withdrawal operation, the blowing and spraying device 5 is moved into the pressing area along the center of press 2 to carry out its function. The grab withdrawal operation along the movement step 16 makes this possible. The grab withdrawal can be smaller or greater here. Any necessary rotation of the workpiece in holders 9 is effected during the grab withdrawal movement 15, 16, 17 to the next machining position outside the center of press 2.

Individually controllable transport members effect each axis of movement of grab carrier 7 along the X, Y and Z-axes necessary for the transport of a workpiece. Each of the axes are perpendicular with respect to each other. Transport slide members 40 are used for movement along the X-axis, the transport slide columns 41 along the Y-axis and the transport slide members 42 along the Z-axis. Parallel transport slide members 40 are slidingly mounted in guide members 43 and parallel slide columns 41 are slidingly mounted in guide members 44. The transport slide member 42 slides along the parallel columns 47 fixedly mounted in housing 24 by bearing blocks 46. Slide member 42 is displaceable on columns 47 and carries column guide member 44 for slide columns 41 which are displaceable in the vertical direction and are connected to column guide 43 as shown.

Individual drive assemblies 48, 49, 50 are used to displace the respective transport members. Assemblies 48, 49, 50 include respective hydraulic rotary piston motors 51, 52, 53 which are each connected to drive the respective transport parts 42, 41 and 43 through respective crank arms 54, 55 and 56 and connecting rods 57, 58 and 59. Each crank arm 54, 55 and 56 carries out an angle of pivot of 180° and back. A sine-shaped speed pattern is produced with this form of drive, which begins with the speed v=0 at the beginning of the movement and accordingly also ends with the speed v=0 at the end of the movement. Thus, relatively large masses may be moved from one place to another in a short time, without any special arrangements being required with respect to control. The cranks and/or the connecting rods are advantageously designed to be length-adjustable in each case. By adjusting the length of the connecting rod between the slide and the crank of the rotary piston motor, the lifting position of the respective transport slide can be changed. By also changing the crank radius, the transport step in the respective axis can also be changed. Moreover, the transport curve can be changed, if required, by suitable selection of the trigger points for the beginning of movement in the respective axes.

A counterweight is used to take the load from the rotary piston motor 52 for the vertical movement along the Y-axis. Such a counterweight is advantageously pneumatic or hydraulic and includes a piston-cylinder unit 60 hinged to the slide 42. The piston rod 61 pivotally engages bracket 62 secured to transport columns 41. The connecting rod 58 of rotary piston motor 52 is also pivotally connected to bracket 62.

The transport members 40, 41 and 47 comprise thin-walled tubes and produce low weight with high rigidity. The pairs of tubes 40, 41 and 47 can be covered with a foldable, flexible material or even folded metal. The individual drive assemblies 48, 49 and 50 may be pneumatic or electrical. The rotary piston motor is of particular preference as a drive element for the transport slide members in each individual axis of transport.

Figure 4:
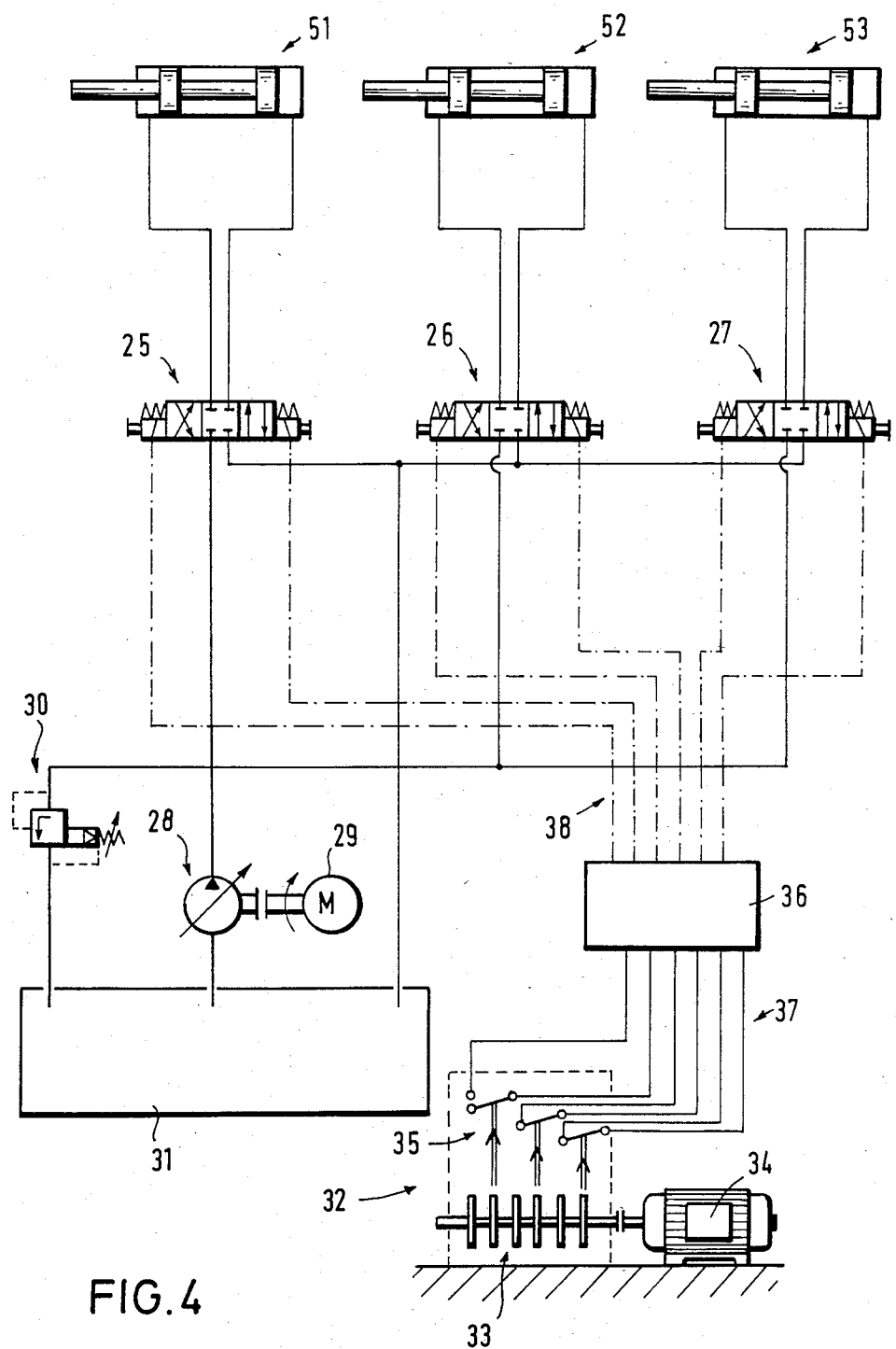
FIG. 4 is a schematic representation of an embodiment of a central control assembly for effecting the movements of the lifting beam along three axes which are perpendicular with respect to each other.

FIG. 4 shows an assembly for controlling the individual drive devices comprising the rotary piston motors 51, 52 and 53. A control valve 25, 26 and 27 is associated with each hydraulically driven rotary piston motor 51, 52 and 53. The supply of hydraulic fluid is undertaken by common pump 28 which is driven by motor 29. A safety valve 30 is located in the return line for the hydraulic fluid contained in vessel 31.

The limit switch gearing assembly 32 includes signal members 35 and a camshaft gear 33 driven by a variable-speed geared motor 34. The camshaft 33 is fitted with pairs of cams for the transport processes. The pairs of cams act upon the certain number of signal members 35 accommodated in the limit switch gear assembly 32 with two signal members, in principal, belonging to each rotary piston motor. Thus, the operation of the rotary motors 51, 52 and 53 will depend upon the actuation of the signal members 35 by the rotary cams mounted in camshaft gear 33. The signal emanating from camshaft gear 33, respectively from the switch drums or cams of the same, reaches an electronic switching apparatus 36 via control line 37. The output signals from this apparatus are passed on to the appropriate control valves 25, 26, and 27 via control lines 38 to actuate respective rotary piston motors 51, 52 and 53.

Geared motor 34 drives the limit switch gear assembly 32 and is switched on for corresponding actuation of the manipulator. The switch drums of camshaft gear 33 are thus set into rotary motion. The respective signal members 35 are actuated in the course of the rotary movements, which in turn lead to the triggering of the corresponding control valves 25, 26, 27 for the hydraulics. The signal emanating from camshaft gear 33 passes into the electronic apparatus 36 where it is processed and then passed on in the form of an output signal to one or several control valves 25, 26, 27 to actuate the associated rotary piston motor via the corresponding control lines 38.

According in each case to the desired course of the lifting path of the manipulator, the individual rotary piston motors are switched on in a certain sequence, so that a corresponding movement is carried out in the individual axes of the lifting beam manipulator. A complete cycle in the limit switch gear is preferably identical to a complete cycle of the lifting beam manipulator on the lifting path 11. Since the speed of geared motor 34 of limit switch gear assembly 32 can be adjusted, this change can be preselected from a control board. Thus, as the speed of the limit switch gear changes, the number of lifts of the lifting beam manipulator also changes.

While the lifting beam manipulator assembly for forging presses has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. An article handling assembly including a lifting beam manipulator for a forging press which has a plurality of work stations and a spraying mechanism for said work stations, said assembly comprising:
    (a) plural workpiece grasping means for carrying workpieces;
    (b) means for effecting movement of the plural workpiece grasping means, sequentially along and outside of the work stations of the forging press and for moving the plural workpiece grasping means into and out of the work stations of the forging press;
    (c) means for moving the spraying mechanism into the work stations of the forging press;
    (d) said movement effecting means including an individual drive assembly to separately and individually effect each movement of the workpiece grasping means along three axes of movement; and
    (e) each individual drive assembly including a separate and individual transport member and a hydraulic rotary piston cylinder connected thereto to effect said movement of each transport member,
    (f) the hydraulic rotary piston cylinder includes a crank arm fitted with a connecting arm, and
    (g) each said crank and rod combination carries out a pivot angle of 180°.

2. An assembly as defined in claim 1 wherein the crank arm and/or the connecting arm are each adjustable in length.

3. An assembly as defined in claim 1 wherein at least one transport member is fitted with a double-column guidance.

4. An assembly as defined in claim 1 wherein the movement effecting means includes a control means for each individual drive means having a limit switch gearing assembly, and
the limit switch gearing assembly includes a camshaft gear and a motor having a variable speed,
the cycle time of the lifting beam manipulator corresponding to the cycle time of the limit switch gearing assembly.

5. An assembly as defined in claim 4 wherein the camshaft gear comprises switch drums with signal members, and
the signal members are linked to control valves of rotary piston motors via an electronic switch apparatus and control lines.

6. An assembly as defined in claim 1 wherein all of the transport members are fitted with a double-column guidance.

7. An assembly as defined in claim 1 wherein the transport member for the movement in the Z-axis is positioned on horizontally fixed columns with drive means for effecting vertical movement in the Y-axis is arranged on the Z-axis transport member on vertically movable columns, and
the transport member for movement of further columns along the X-axis is connected to the vertically movable columns.

8. An assembly as defined in claim 7 wherein the Y-axis drive means for the vertical movement is coupled to a counterweight device.

9. An assembly as defined in claim 8 wherein the counterweight device is of a pneumatic type.

10. An assembly as defined in claim 8 wherein the counterweight device is of a hydraulic type.

11. An article handling assembly including a lifting beam manipulator for a forging press which has a plurality of work stations and a spraying mechanism for said work stations, said assembly comprising:
 (a) plural workpiece grasping means for carrying workpieces;
 (b) means for effecting movement of the plural workpiece grasping means, sequentially along and outside of the work stations of the forging press and for moving the plural work-piece grasping means into and out of the work stations of the forging press;
 (c) means for moving the spraying mechanism into the work stations of the forging press;
 (d) said movement effecting means including an individual drive assembly to separately and individually effect each movement of the workpiece grasping means along three axes of movement; and
 (e) each individual drive assembly including a separate and individual transport member and a hydraulic rotary piston cylinder connected thereto to effect said movement of each transport member,
 (f) the movement effecting means includes a control means for each individual drive means having a limit switch gearing assembly, and
 (g) the limit switch gearing assembly includes a camshaft gear and a motor having a variable speed,
 (h) the cycle time of the lifting beam manipulator corresponding to the cycle time of the limit switch gearing assembly.

12. An assembly as defined in claim 11 wherein
the camshaft gear comprises switch drums with signal members, and
the signal members are linked to the control valves of rotary piston motors via an electronic switching apparatus and control lines.

13. An article handling assembly including a lifting beam manipulator for a forging press which has a plurality of work stations and a spraying mechanism for said work stations, said assembly comprising:
 (a) plural workpiece grasping means for carrying workpieces;
 (b) means for effecting movement of the plural workpiece grasping means, sequentially along and outside of the work stations of the forging press and for moving the plural workpiece grasping means into and out of the work stations of the forging press;
 (c) means for moving the spraying mechanism into the work stations for the forging press;
 (d) said movement effecting means including an individual drive assembly to separately and individually effect each movement of the workpiece grasping means along three axes of movement; and
 (e) each individual drive assembly including a separate and individual transport member and a hydraulic rotary piston cylinder connected thereto to effect said movement of each transport member,
 (f) the transport member for the movement in the Z-axis is positioned on horizontally fixed columns with drive means for effecting vertical movement in the Y-axis is arranged on the Z-axis transport member on vertically movable columns, and
 (g) the transport member for movement of further columns along the X-axis is connected to the vertically movable columns.

14. An assembly as defined in claim 13 wherein
the Y-axis drive means for the vertical movement is coupled to a counterweight device.

15. An assembly as defined in claim 14 wherein
the counterweight device is of a pneumatic type.

16. An assembly as defined in claim 14 wherein
the counterweight device is of a hydraulic type.

* * * * *